United States Patent [19]

Nishina et al.

[11] Patent Number: 4,803,260

[45] Date of Patent: Feb. 7, 1989

[54] RECOVERY OF VINYL CHLORIDE RESIN WITH AID OF SCREEN

[75] Inventors: Masaaki Nishina, Takaoka; Junsei Kawahuti, Kamakura, both of Japan

[73] Assignee: Nippon Zeon Co., Ltd., Tokyo, Japan

[21] Appl. No.: 823,573

[22] Filed: Jan. 29, 1986

[30] Foreign Application Priority Data

Jan. 31, 1985 [JP] Japan .................................. 60-17429

[51] Int. Cl.$^4$ ............................ C08F 6/24; C08F 6/14
[52] U.S. Cl. ..................................... 528/487; 209/17; 528/491; 528/497; 528/502
[58] Field of Search ............... 528/487, 491, 499, 497, 528/503, 502

[56] References Cited

U.S. PATENT DOCUMENTS

| | | | |
|---|---|---|---|
| 2,613,191 | 10/1952 | McGaffin | 524/569 |
| 2,624,718 | 1/1953 | Bezman | 524/569 |
| 3,545,093 | 12/1970 | Forster | 34/164 |
| 4,604,454 | 8/1986 | Nishina et al. | 528/491 |

FOREIGN PATENT DOCUMENTS

| | | | |
|---|---|---|---|
| 2453909 | 5/1976 | Fed. Rep. of Germany | 528/499 |
| 57-209905 | 12/1982 | Japan | 528/491 |

OTHER PUBLICATIONS

Processes for Major Addition-Type Plastics and Their Monomers, p. 244, Albright, 1984.

*Primary Examiner*—Christopher A. Henderson, Jr.
*Attorney, Agent, or Firm*—Sherman and Shalloway

[57] ABSTRACT

A recovery method of vinyl chloride resin which comprises formulating an aggregate of vinyl chloride resin by adding to an aqueous dispersion of vinyl chloride resin an organic liquid which is difficultly soluble in water and does not dissolve or swell vinyl chloride resin and mixing the two; dehydrating the aggregate; and drying the same to recover granular vinyl chloride resin, the characteristic feature residing in that said aqueous dispersion is the one which has passed through the screen of 20 to 150-micron meshes.

9 Claims, No Drawings

RECOVERY OF VINYL CHLORIDE RESIN WITH AID OF SCREEN

This invention relates to a recovery method of vinyl chloride resin, particularly the granular vinyl chloride resin to be used for making paste.

As the means for recovering vinyl chloride resin to be used for making paste, normally aqueous dispersions of the resin obtained through emulsion polymerization, fine suspension polymerization or the like are spray-dried. Because the resins obtained by such methods are in the form of fine powder, they not only cause worsening of working environment as they scatter during their bagging, bag-opening and mixing in the course of making paste sol, but also are difficult of automatic measurement and transfer due to their poor powder fluidity.

The present inventors previously discovered that if a specific organic liquid is added to, and mixed with, an aqueous dispersion of vinyl chloride resin, the vinyl chloride resin could be separated from the aqueous phase as granular aggregate which, when subsequently dried, provides granular vinyl chloride resin exhibiting excellent fluidity as powder, less tendency to scatter, and excellent dispersibility when converted to a paste sol (Japanese Kokai (laid-open to public inspection) Nos. 209905/1982, 59249/1983 and 102935/1984). However, still in the paste sols made of the granular vinyl chloride resin recovered by such a method, un-dispersed substance (particulate substance hardly dispersible in plasticizers) is not entirely absent, and there remains the danger or possibility that the same clogs the strainer normally provided for removing foreign matters at the stage preceding the shaping step of paste sol or causes streaks to appear on the surfaces of products during the coating step.

An object of the present invention is to provide a recovery method of granular vinyl chloride resin which is substantially free of such un-dispersed substance.

The present inventors discovered that, in the recovering method comprising formulating an aggregate of vinyl chloride resin by adding an organic liquid which is difficultly soluble in water and does not dissolve or swell the vinyl chloride resin, to an aqueous dispersion of the vinyl chloride resin and mixing the two; dehydrating said aggregate; and drying the same, if as the aqueous dispersion the one which has passed through a screen of 20 to 150-micron meshes is used, content of the undispersed substance in the paste sol made from the recovered vinyl chloride resin can be reduced, and consequently the clogging of strainers for removing foreign matters or the streaks appearing on the products' surfaces in the coating step can be markedly prevented.

The method of this invention consists basically of (1) the first step of mixing an aqueous dispersion of the resin, which has passed through a screen of 20 to 150-micron meshes, with an organic liquid to cause aggregation of the resin through the organic liquid; (2) the second step of separating and removing the aqueous phase from the liquid mixture obtained in the first step which contains the resin aggregate; (3) the third step of dehydrating and drying the resin aggregate from which the aqueous phase has been removed; and, if necessary (4) the forth step of mixing the resin contained in the aqueous phase separated in the second step, with the starting materials used in the first step.

The "aqueous dispersion of vinyl chloride resin" to be used in the present invention include aqueous dispersions of vinyl chloride homopolymers or copolymers composed mainly of vinyl chloride (normally copolymers composed of at least 70% by weight of vinyl chloride and at most 30% by weight of an olefinic monomer or monomers such as vinyl acetate, vinylidene chloride, ethylene, propylene, butene, acrylonitrile, acrylate, methacrylate, or maleic acid) prepared by ordinary emulsion polymerization, fine suspension polymerization, or suspension polymerization. The aqueous dispersions are subject to no specific limitations so long as they are fit for normal processing. If necessary, they may contain vinyl chloride resin as a thickener. The vinyl resin content of the aqueous dispersion ranges from 10–70% by weight. Therefore, normally the aqueous dispersion of vinyl chloride resin as left the polymerization apparatus can be conveniently used as it is. If necessary, however, it may be partly dehydrated, or fresh water may be added thereto. If the resin content is less than 10% by weight, the waste water becomes quantitatively in excess of the product and the method becomes uneconomical. Conversely, when it exceeds 70% by weight, viscosity of the mixture of aqueous dispersion with the organic liquid rises unduly to render the operation difficult.

For treating the aqueous dispersion of vinyl chloride resin through the screen of specified mesh sizes, any of static screens such as basket-formed strainers, vibration-discharge type screens, centrifugal filtration-type separators, etc. may be used. In order to improve the effect of screen-treatment of the aqueous dispersion, such means as pre-treating the aqueous dispersion with a screen of greater mesh sizes, advance removal of coarse grains in the aqueous dispersion by natural sedimentation, centrifugal sedimentation, liquid cyclone or the like, advance grinding of coarse grains in the aqueous dispersion by ultrasonic dispersion treatment or mechanical dispersion treatment, etc. may be practiced. Those means can be suitably combined to achieve greater effects. Particularly when the aqueous dispersion is subjected to an ultrasonic dispersion treatment in advance, the clogging of screen meshes is markedly reduced, and consequently the filtration rate of the aqueous dispersion through the screen is increased and the resin loss remaining on the screen as un-filtered is reduced, the result being very favorable. Furthermore, if the coarse grains remaining on the screen of specified mesh sizes can be ground to the sizes passable through said mesh sizes by an ultrasonic or mechanical dispersion treatment, their use is quite permissible. When the mesh sizes exceed 150 microns, aforesaid troubles such as clogging of strainers during the paste-making step or appearance of streaks in the coating step cannot be sufficiently prevented. Whereas, when the mesh sizes are less than 20 microns, there is no qualitative problem. However, the time and labor for the screen treatment markedly increase, and furthermore the resin loss caused by the screen treatment also increases. Therefore such fine mesh sizes are impractical.

The organic liquid to be added to such aqueous dispersion of vinyl chloride resin is difficultly water-soluble, and does not dissolve or swell the resin during the recovery of the resin in accordance with the present invention. Such an organic liquid is normally selected from those having melting points not higher than 20° C., and boiling points under atmospheric pressure higher than the recovery temperature of the resin of this invention, preferably not lower than 200° C. If an organic liquid having a boiling point below the recovery temperature of the resin is used, the liquid will volatilize, and additional equipments are required for its recovery, which renders the method uneconomical. Obviously, an organic liquid by itself failing to meet above requirements may be used in combination with others, if the mixture meets the requirements.

There are two reasons why the organic liquid must be difficultly water-soluble. First, after its mixing with the aqueous dispersion, its entrainment into the aqueous phase which is to be separated should be kept to the minimum to prevent loss of the organic liquid as well as to reduce the cost of waste water treatment. Second, in order to cause aggregation of resin granules dispersed in water, through the organic liquid, the organic liquid must be present between the resin granules and water as a liquid phase having an interface.

Again, if the organic liquid can dissolve or swell the resin, the resin granules show objectionable deformation or degradation. Furthermore, because the greatest part of the organic liquid used in the present invention remains in the product resin, use of any liquid which adversely affects the processability and the quality of shaped products must be avoided. In view of the foregoing, it is most logical to use the liquid composition used for normal processing as "organic liquid".

Examples of organic liquid useful for the present invention include the following:

(1) alkyl phthalate-type plasticizers such as dioctyl phthalate, dinonyl phthalate, butyl-lauryl phthalate and methyl-oleyl phthalate, (2) aromatic carboxylate-type plasticizers such as trioctyl trimellitate and diethylene glycol dibenzoate, (3) aliphatic dibasic acid ester-type plasticizers such as dioctyl adipate, dibutyl sebacate and dioctyl tetrahydrophthalate, (4) phosphate-type plasticizers such as trioctyl phosphate and trichloroethyl phosphate, (5) aliphatic glycol ester-type plasticizers such as diethylene glycol dicaprylate and 1,4-butylene glycol-di-2-ethylhexanoate, (6) polyester-type plasticizers, (7) fatty acid ester-type secondary plasticizers such as butyl oleate, methyl acetylricinoleate and 2,2,4-trimethyl-1,3-pentanone-diol-diisobutyrate; epoxy-type secondary plasticizers such as epoxidized soybean oil and octyl epoxystearate; paraffin-type secondary plasticizers such as methyl ester of chlorinated fatty acid and chlorinated paraffin; and aliphatic dibasic acid ester-type secondary plasticizer such as dioctyl succinate, (8) petroleum diluents such as mineral spirit and mineral terpene; and long-chain alkylbenzene-type diluents such as dodecylbenzene, and (9) liquid lubricants such as higher alcohol, liquid paraffin and alkyl esters of higher fatty acids.

Such an organic liquid is used in an amount of, normally 0.5–30 parts by weight, preferably 1–15 parts by weight, per 100 parts by weight of the resin in the aqueous dispersion. If it is less than 0.5 part by weight, the resin cannot sufficiently aggregate through the organic liquid. Whereas, when it exceeds 30 parts by weight, sol-like aggregate is apt to form, and even if a granular aggregate could be formed, its organic liquid content is high. Consequently the removal of residual liquid in the drying step becomes difficult, and the production efficiency decreases.

The mixing time of the aqueous dispersion of resin with the organic liquid may be suitably selected, while avoiding excessive generation of heat.

The mixing device may be selected among those which satisfy the predetermined conditions. Generally batchwise agitation tank-type mixers, multiblade-type continuous mixers, high-speed rotation-type continuous mixers, vessel-rotation type mixers, liquid-dividing type static mixers and the like may be suitably used. Ultrasonic mixing may also be effected.

Mixing of the organic liquid and the aqueous dispersion of resin is performed at the temperatures not higher than 70° C. and at which the organic liquid employed does not dissolve or swell the resin. As the higher the temperature, the greater the swelling rate of the resin by the organic liquid, preferably the mixing is performed at 50° C. or below. When it exceeds 70° C., not only absorption of the organic liquid into the resin is accelerated, but the resin may be softened and integrated, to make the resultant product no more suitable for subsequent processing.

Next, known methods may be applied for dehydrating the granular aggregate of the resin, collected through the organic liquid, depending on the form of the recovered resin. It is important in this occasion, the temperature should be kept at no higher than 70° C., in order to prevent softening and integration of the resin.

The resin granules separated at the dehydration step are then transferred to the drying step, and whereas the picked-up water is removed. In this drying step, broad varieties of known drying machines can be used, while suitable drying conditions must be set up so that the extent of aggregation and integration of the resin caused by the drying will not impair the dispersibility during the subsequent processing. Accordingly, for example, temperature of the resin throughout the drying step is kept at not higher than 70° C., preferably not higher than 50° C.

Thus obtained dry, granular product exhibits excellent fluidity and little scattering tendency, and furthermore contains extremely little un-dispersed substance. Consequently, the resin exhibits excellent properties when processed into paste sol, such as it scarcely causes clogging of strainers or formation of streaks on the surfaces of products during the subsequent processing.

Hereinafter the present invention will be more specifically explained with reference to working Examples. In the Examples and Comparative Examples, parts and percentages are by weight, unless otherwise specified.

EXAMPLE 1

An aqueous dispersion of vinyl chloride resin for paste making was filtered through a vibrating screen applied with a wire net of 74-micron meshes (Model 400, manufactured by K. K. San-ei Seisakujo), and 11,000 g of which (solid content: 30% by weight) and 300 g of di-2-ethylhexyl phthalate were charged in a tank-type mixer having a diameter of 20 cm and a capacity of 12 liters. After mixing the content for 30 minutes at 30° C. and 1200 rpm, an aqueous dispersion of granular resin was obtained. The dispersion was placed in a Buchner funnel using a filter cloth of 100 cc/sec.cm$^2$ permeability and vacuum-dehydrated, to provide a granular product having a water content of 28%. The product was dried in a hot air circulation type drier for 15 hours at 35° C., to provide a granular vinyl chloride resin (A).

EXAMPLE 2

An aqueous dispersion of vinyl chloride resin for paste-making (solid content: 30% by weight) 40,000 g was fed into an ultrasonic washer of 50 liters in capacity and 1200 W in output, treated for 20 minutes and then filtered through a vibrating screen applied with a wire net of 44-micron meshes. This aqueous dispersion was subsequently subjected to the mixing, dehydration and drying in the same manner to Example 1, to provide a granular vinyl chloride resin (B).

EXAMPLE 3

Example 1 was repeated except that the mesh sizes of the wire net were made 105 microns. Thus a granular vinyl chloride resin (C) was obtained.

EXAMPLE 4

An aqueous dispersion of vinyl chloride resin for paste-making (solid content: 30% by weight) 12,000 g was filtered through a vibrating screen applied with a wire net of 74-micron meshes. Whereupon 65 g of vinyl chloride resin with a water content of 55% remained on the screen, which was dispersed in an ultrasonic disperser, Model UR-200P manufactured by Tomy K. K. When the dispersed system was again filtered through a sieve of 74-micron meshes, 60 g thereof passed through the sieve and 5 g remained on the sieve. Said 60 g of the filtrate was added to 11,000 g of the aqueous dispersion which had already passed through the wire net of 74-micron meshes, and subjected to the mixing, dehydration and drying in the same way as in Example 1, to provide a granular vinyl chloride resin (D).

COMPARATIVE EXAMPLE 1

Example 1 was repeated except that the vibrating screen treatment was omitted. Thus a granular vinyl chloride resin (E) was obtained.

COMPARATIVE EXAMPLE 2

Example 1 was repeated except that the mesh sizes of the wire net were enlarged to 250 microns. A granular vinyl chloride resin (F) was obtained.

COMPARATIVE EXAMPLE 3

Example 2 was repeated except that the vibrating screen treatment was omitted. A granular vinyl chloride resin (G) was obtained.

COMPARATIVE EXAMPLE 4

The same aqueous dispersion of resin employed in Example 1 (except that it was not filtered through the vibrating screen) was dried in a spray drier at an entrance temperature of 160° C. and exit temperature of 56° C. and ground with a table pulverizer to provide a fine powdery vinyl chloride resin (H).

<Evaluation of vinyl chloride resin properties>

The powder characteristics and sol (that formulated by mixing 50 g of the resin sample with 30 g of di-2-ethylhexyl phthalate with a grinder) characteristics of the resins (A) through (H) obtained in the foregoing Examples and Comparative Examples were evaluated as to the following items. The results were as given in the Table.

Angle of repose:
This indicates fluidity of powder. The less is this value, the more flowable is the powder.

Bulk density:
This is an apparent density of a powder. Greater bulk density indicates better handling property.

North fineness:
This indicates particle sizes of the resin in the form of sol. Greater North fineness means less particle sizes (8 meaning the finest and 0, the coarsest).

Number of un-dispersed substance:
This is a property indicating the particle sizes of the resin in the form of sol. A sample sol is spread on a sheet glass at a thickness of 100 microns, and the number of visible undispersed substances present in the area of 5 cm square (25 cm$^2$) is counted. Even when the North fineness value is as good as 6–7, in certain cases large (bad) values may be obtained in this count. When the number of undispersed substances in the area of 5 cm square is not more than 10, clogging of the strainer and formation of streaks on the product's surface during the paste-processing do not take place, but when it is more than 10, the possibility of occurrence of those defects is high.

TABLE

| Sample No. | Example 1 (A) | Example 2 (B) | Example 3 (C) | Example 4 (D) | Comp. Ex. 1 (E) | Comp. Ex. 2 (F) | Comp. Ex. 3 (G) | Comp. Ex. 4 (H) |
|---|---|---|---|---|---|---|---|---|
| Mesh sizes of screen (microns) | 74 | 44 | 105 | 74 | No screen treatment | 250 | No screen treatment | No screen treatment |
| Powder characteristics | | | | | | | | |
| Angle of repose (degrees) | 35 | 34 | 34 | 35 | 35 | 34 | 36 | 53 |
| Bulk density (g/cc) | 0.55 | 0.54 | 0.55 | 0.53 | 0.56 | 0.56 | 0.55 | 0.29 |
| Sol dispersibility | | | | | | | | |
| North fineness | 7 | 7 | 7 | 7 | 6.5 | 6.5 | 6.5 | 4.5 |
| Number of undispersed substances (number/25 cm$^2$) | 9 | 6 | 8 | 7 | 50 | 30 | 30 | 6 |

What we claimed is:

1. A method for recovering vinyl chloride resin selected from the group consisting of vinyl chloride homopolymer and vinyl chloride copolymers composed of at least 70% by weight of vinyl chloride and up to 30% by weight of at least one olefinic monomer copolymerizable with vinyl chloride, said homopolymer or copolymer being prepared by emulsion polymerization, fine suspension polymerization or suspension polymerization, from an aqueous dispersion thereof, said aqueous dispersion having a vinyl resin content of from 10 to 70% by weight, which comprises
    (a) passing the aqueous dispersion of the vinyl chloride resin through a screen of 20 to 150 micron mesh;

(b) mixing the aqueous dispersion which has passed through said screen with an organic liquid which is difficultly soluble in water and does not dissolve or swell vinyl chloride resin, said mixing causing aggregation of the dispersed vinyl chloride resin;

(c) separating and removing the aqueous phase from the liquid mixture containing the resin aggregate obtained in step (b); and (d) dehydrating and drying the resin aggregate from which the aqueous phase has been separated in step (c).

2. The method of claim 1 in which the amount of the organic liquid to be added ranges from 0.5 to 30 parts by weight per 100 parts by weight of the vinyl chloride resin in the aqueous dispersion.

3. The method of claim 1 in which the organic liquid is selected from alkyl phthalate-type plasticizers.

4. The method of claim 1 in which the mixing of the organic liquid with the aqueous dispersion of vinyl chloride resin is performed at a temperature within the range of 20° to 70° C.

5. The method of claim 1 which further comprises (a)' subjecting the aqueous dispersion to an ultrasonic dispersion treatment prior to step (a).

6. The method of claim 1 wherein the organic liquid is mixed with the aqueous dispersion at a temperature of from 20° C. to 70° C. in an amount of from 0.5 to 30 parts by weight per 100 parts by weight of the vinyl chloride resin in the aqueous dispersion, said organic liquid having a melting point not higher than 20° C. and a boiling point not lower than 200° C. and being selected from the group consisting of (1) alkylphthalate plasticizers, (2) aromatic carboxylate plasticizers, (3) aliphatic dibasic acid ester plasticizers, (4) phosphate plasticizers, (5) aliphatic glycol ester plasticizers, (6) polyester plasticizers, (7) fatty acid ester secondary plasticizers, epoxy secondary plasticizers, paraffin secondary plasticizers, aliphatic dibasic acid ester secondary plasticizers, (8) petroleum diluents and (9) liquid lubricants.

7. The method of claim 1 wherein in step (a) the aqueous dispersion is passed through a screen of 44 micron mesh.

8. The method of claim 1 wherein in step (a) the aqueous dispersion is passed through a screen of 77 micron mesh.

9. The method of claim 1 wherein in step (a) the aqueous dispersion is passed through a screen of 105 micron mesh.

* * * * *